United States Patent

Blanco

[11] Patent Number: 5,827,397
[45] Date of Patent: Oct. 27, 1998

[54] MIXED OFFICE WASTEPAPER DEINKING PROCESS

[75] Inventor: Ruth Javier Blanco, Houston, Tex.

[73] Assignee: Shell Oil Company, Houston, Tex.

[21] Appl. No.: 819,219

[22] Filed: Mar. 17, 1997

Related U.S. Application Data

[63] Continuation of Ser. No. 541,988, Oct. 10, 1995, abandoned.

[51] Int. Cl.⁶ ..................................................... D21C 5/02
[52] U.S. Cl. ..................................................... 162/5; 162/4
[58] Field of Search ..................................... 162/4, 5, 6, 8

[56] References Cited

U.S. PATENT DOCUMENTS

| | | | |
|---|---|---|---|
| 3,557,956 | 1/1971 | Braun et al. | 162/5 |
| 4,052,342 | 10/1977 | Fernley et al. | 252/541 |
| 4,079,020 | 3/1978 | Mills et al. | 252/547 |
| 4,235,752 | 11/1980 | Rossall et al. | 252/551 |
| 4,316,824 | 2/1982 | Pancheri | 252/551 |
| 4,507,219 | 3/1985 | Hughes | 252/118 |
| 4,556,509 | 12/1985 | Demangeon et al. | 252/542 |
| 4,561,933 | 12/1985 | Wood et al. | 162/5 |
| 4,561,998 | 12/1985 | Wertz et al. | 252/547 |
| 4,595,526 | 6/1986 | Lai | 252/545 |
| 4,596,672 | 6/1986 | MacDuff et al. | 252/544 |
| 4,614,612 | 9/1986 | Reilly et al. | 252/541 |
| 4,663,069 | 5/1987 | Llenado | 252/117 |
| 4,732,707 | 3/1988 | Naik et al. | 252/548 |
| 4,880,569 | 11/1989 | Leng et al. | 252/550 |
| 4,923,635 | 5/1990 | Simion et al. | 252/545 |
| 4,923,636 | 5/1990 | Blackburn et al. | 252/550 |
| 5,035,838 | 7/1991 | Merrill et al. | 252/545 |
| 5,075,041 | 12/1991 | Lutz | 252/548 |
| 5,096,622 | 3/1992 | Simion et al. | 252/548 |
| 5,219,495 | 6/1993 | Hsu | 252/559 |

FOREIGN PATENT DOCUMENTS

399752 A2  11/1990  European Pat. Off. .

*Primary Examiner*—Peter Chin
*Assistant Examiner*—Steven B. Leavitt
*Attorney, Agent, or Firm*—Pamela J. McCollough

[57] ABSTRACT

This invention related to a process for the deinking of a mixture of xerographically printed wastepaper stocks and ledger printed wastepaper stocks which comprises:

a) converting the wastepaper to a pulp, b) contacting the pulp with an aqueous medium of alkaline pH containing between about 0.05 and about 2 percent by weight, calculated on a dry weight basis of the pulp, of a deinking agent comprising a first component comprising at least one ethylene oxide adduct of a detergent-range alcohol having in the range of from about 8 to about 20 carbon atoms and an average of from about 3 to about 20 oxyethylene units per molecule of alcohol, a second component selected from the group consisting of one or more detergent-range olefins having from about 8 to about 22 carbon atoms, one or more saturated hydrocarbons having from about 8 to about 20 carbon atoms, and mixtures thereof, and a third component comprising a detergent-range alcohol component having from about 8 to about 20 carbon atoms, and c) treating the resulting pulp-containing medium by washing or flotation to remove suspended ink therefrom.

12 Claims, No Drawings

MIXED OFFICE WASTEPAPER DEINKING PROCESS

This is a continuation of application Ser. No. 08/541,988, filed Oct. 10, 1995, now abandoned.

FIELD OF THE INVENTION

This invention relates to a process for the removal of ink from a mixture of printed office wastepaper in the course of reclaiming the fiber content of the waste for reuse in the manufacture of new paper. More particularly, the invention relates to a process for the deinking of a wastepaper mixture comprising both xerographically printed paper or paper printed using a laser printer and ledger printed paper.

BACKGROUND OF THE INVENTION

Wastepaper has long served as a source of the raw fiber materials used in papermaking. Traditionally, fiber from wastepaper was utilized only in the production of low grade paper and paperboard products. Today, however, greater utilization of reclaimed fiber has provided incentive for taking steps to upgrade the reclaimed product. These steps include treatment to effectively remove ink from waste fibers in order to permit their use in the manufacture of newsprint and high quality papers. Increasing amounts of office waste paper are becoming available. Because of the high quality cellulose fiber in office waste paper, efficient ink removal is particularly desirable since excellent quality, high value products can be prepared from this deinked pulp.

In the course of the conventional paper reclamation process of interest, deinking procedures include steps for converting the wastepaper to pulp and contacting the pulp with an alkaline aqueous deinking medium containing a chemical deinking agent. The physical pulping and the alkalinity of the aqueous medium cause the partial detachment of ink from the cellulose paper fibers and the deinking agent completes this removal and produces an aqueous suspension and/or dispersion of the ink particles thus detached from the paper cellulose fibers. The chemical deinking agent plays an important role in determining the size and geometry of the dispersed ink particles. The resulting mixture is subsequently treated to separate the suspended ink from the pulp.

A variety of materials, particularly surfactants and mixtures of surfactants are known to be useful as deinking agents in such a process, at least when the process is applied to the deinking of such common wastepaper stocks as newsprint, book, magazine and ledger. It is recognized, however, that conventional processes have not been particularly successful in specific application to a mixture of ledger printed wastepapers and xerographically printed wastepapers and laser printed wastepapers. The difficulty encountered in the deinking of these wastepapers has been attributed to the character of electrostatic ink, specifically the binder, which is fundamentally different from that used in other printing processes. For example, in distinction to the common oil or resin binders of other inks, the electrostatic ink binder is typically a polymeric material (e.g., copolymers of styrene and acrylate monomers, copolymers of styrene and butadiene, and polyester resins) which during the printing process is fixed to the paper by application of heat.

The ever-increasing utilization of xerographic and laser printed paper has made reclamation of office wastepaper containing a mixture of ledger printed paper and xerographically or laser printed paper economically attractive.

Accordingly, the object of the present invention is a deinking process which is effective in the treatment of a mixture of xerographically printed wastepaper stocks and ledger printed wastepaper stocks. As used herein, "mixed office wastepaper" refers to a mixture of xerographically or laser printed stocks and ledger printed stocks.

The present invention centers on the use in a deinking process of a chemical deinking agent which comprises a detergent-range (e.g., $C_8$ to $C_{20}$) alcohol ethoxylate component, a component selected from the group consisting of a detergent-range olefin, a $C_8$ to $C_{20}$ saturated hydrocarbon and mixtures thereof, and a component comprising a detergent-range alcohol. It is known in the art that the removal of ink from wastepaper can be accomplished by a process in which the paper is reduced to pulp and the pulp is contacted with an aqueous medium containing a surfactant as a deinking agent. For example, it is known from U.S. Pat. No. 4,561,933, that xerographically printed wastepaper can be deinked using a mixture of one or more $C_5$ to $C_{20}$ alkanols and nonionic surfactant. It is also known in the paper deinking art (for example, U.S. Pat. No. 4,162,186) to employ chemical agents which are ethylene oxide adducts ("ethoxylates") of detergent-range alcohols or alkyl-substituted phenols containing an average of about 7 to about 15 oxyethylene units per molecule of alcohol. It is further known from U.S. Pat. No. 4,518,459 to use surfactants for deinking which are hydroxy-terminated or benzyl ether-terminated ethylene oxide-propylene oxide adducts (ethoxypropoxylates) of high molecular weight or long chain alcohols.

It has now been found that a combination of one or more ethoxylated detergent-range alcohols, one or more detergent-range olefins and/or saturated hydrocarbons and one or more detergent-range alcohols is very usefully applied as a deinking agent in process for the deinking of a mixture of xerographically printed wastepaper and ledger printed wastepaper. Processes applying this deinking agent are found to offer a high level of performance from the standpoint of the overall brightness and low level of residual visible ink particle of papers prepared from the deinked pulp. In addition, the invention provides for low foaming and high biodegradability without adverse influence upon deinking performance and reclaimed paper product brightness.

SUMMARY OF THE INVENTION

The invention therefore relates to a process for the deinking of a mixture of xerographically printed wastepaper stocks and ledger printed wastepaper stocks which comprises:

a) converting the wastepaper to a pulp, b) contacting the pulp with an aqueous medium of alkaline pH containing between about 0.05 and about 2.0 percent by weight, calculated on a dry weight basis of the pulp, of a deinking agent comprising a first component comprising at least one ethylene oxide adduct of a detergent-range alcohol having in the range of from about 8 to about 20 carbon atoms and an average of from about 3 to about 20 oxyethylene units per molecule of alcohol, a second component selected from the group consisting of one or more detergent-range olefins, one or more saturated hydrocarbons and mixtures thereof, and a third component comprising a detergent-range alcohol component having from about 8 to about 20 carbon atoms, and c) treating the resulting pulp-containing medium by washing or flotation to remove suspended ink therefrom.

DESCRIPTION OF THE PREFERRED EMBODIMENTS

The present invention is generally applicable to the deinking of a mixture of xerographically printed or laser printed wastepaper stocks and ledger printed wastepaper stocks, and also to practices and procedures conventionally employed for their processing. Generally, any such process comprises three principal steps: the first, a step to reduce the wastepaper feed to pulp, the second, a contact between the pulp and an alkaline aqueous medium containing the deinking agent to produce a suspension or dispersion of the ink, and, the third, a treatment of the resulting pulp containing medium to remove suspended or dispersed ink particles therefrom. The first two steps of the process, however, may be combined.

The present invention centers upon the composition and performance of the deinking agent. For purposes of the invention, the deinking agent has at least three components, with the first component being an ethoxylated detergent-range alcohol, the second component being selected from the group consisting of one or more detergent-range olefins, one or more saturated hydrocarbons and mixtures thereof, and the third component being one or more detergent range alcohols. The components are typically blended together using conventional means prior to use in a deinking process.

The first component of the deinking agent is one or more oxyethylene adducts (or ethoxylates) of detergent-range alcohols having from about 3 to about 20 oxyethylene units per molecule of alcohol. Such alcohol ethoxylates are represented by the formula $$R\text{—}O\text{—}(CH_2\text{—}CH_2O)_n\text{—}H \qquad (I)$$

wherein R is a straight-chain or branched-chain alkyl group having in the range of from about 8 to about 20 carbon atoms, preferably from about 12 to about 18 carbon atoms, or an alkylaryl group having an alkyl moiety having from about 8 to about 12 carbon atoms and n represents the average number of oxyethylene groups per molecule and is a number in the range of from about 3 to about 20, preferably in the range of from about 3 to about 13, and more preferably in the range of from about 3 to about 7. The alkyl group can have a carbon chain which is straight or branched. Preferably, about 80 percent of the R groups in the alcohol ethoxylates utilized in the instant invention are straight-chain. It is understood that R can be substituted with any substituent which is inert such as, for example, halogen groups. Ethoxylates within this class are conventionally prepared by the addition of ethylene oxide to the corresponding alcohol (ROH) in the presence of a catalyst.

The alcohol ethoxylate component of the deinking agent in the instant invention is preferably derived by ethoxylation of primary or secondary, straight-chain or branched alcohols. Suitably, the alcohols have from about 8 to about 20 carbon atoms, preferably from about 9 to about 15 carbon atoms, and more preferably from about 12 to about 15 carbon atoms. The most common ethoxylates in this class and the ones which are particularly useful in this invention are the primary alcohol ethoxylates, i.e., compounds of formula I in which R is an alkyl group and the —O—(CH$_2$—CH$_2$O)$_n$—H ether substituent is bound to a primary carbon of the alkyl group.

Alcohols which are suitable for ethoxylation to form the alcohol ethoxylate component of the deinking agent of the instant invention include coconut fatty alcohols, tallow fatty alcohols, and the commercially available synthetic long-chain fatty alcohol blends, e.g., the $C_{12}$ to $C_{15}$ alcohol blends available as NEODOL 25 Alcohol (a registered trademark of product manufactured and sold by Shell Chemical Company), the $C_{14}$ to $C_{15}$ alcohol blends available as NEODOL 45 Alcohol, the $C_{12}$ to $C_{14}$ alcohol blends available as Tergitol 24L (a registered trademark of product manufactured and sold by Union Carbide Corporation), and the $C_{12}$ to $C_{13}$ alcohol blends available, for example, as NEODOL 23 Alcohol (Shell).

Suitable alcohol ethoxylates can be prepared by adding to the alcohol or mixture of alcohols to be ethoxylated a calculated amount, e.g., from about 0.1 percent by weight to about 0.6 percent by weight, preferably from about 0.1 percent by weight to about 0.4 percent by weight, based on total alcohol, of a strong base, typically an alkali metal or alkaline earth metal hydroxide such as sodium hydroxide or potassium hydroxide, which serves as a catalyst for ethoxylation. The resulting mixture is dried, as by vapor phase removal of any water present, and an amount of ethylene oxide calculated to provide the desired number of moles of ethylene oxide per mole of alcohol is then introduced and the alcohol ethoxylate is allowed to react until the ethylene oxide is consumed, the course of the reaction being followed by the decrease in reactor pressure.

Preferred alcohol ethoxylate components for use in the deinking agents in the present invention include ethoxylated fatty alcohols, preferably linear primary alcohols with about $C_8$ to about $C_{20}$, preferably about $C_{12}$ to about $C_{15}$ alkyl groups, and an average of from about 3 to about 20, more preferably in the range of from about 3 to about 13, and most preferably in the range of from about 3 to about 7 moles of ethylene oxide per mole of alcohol.

A particularly preferred class of alcohol ethoxylates is represented by the condensation product of a fatty alcohol having from about 12 to about 15 carbon atoms and from about 3 to about 13 moles of ethylene oxide per mole of fatty alcohol. Suitable species of this class of ethoxylates include: the condensation product of $C_{12}$–$C_{15}$ oxo-alcohols and 3 moles of ethylene oxide; the condensation product of narrow cut $C_{14}$–$C_{15}$ oxo-alcohols and 7 moles of ethylene oxide per mole of fatty (oxo)alcohol; and the condensation of a narrow cut $C_{12}$–$C_{13}$ fatty (oxo)alcohol and 6.5 moles of ethylene oxide per mole of fatty alcohol. The fatty oxo-alcohols, while primarily linear, can have, depending upon the processing conditions and raw material olefins, a certain degree of branching.

The second component of the deinking agent is selected from the group consisting of one or more detergent-range olefins, one or more saturated hydrocarbons and mixtures thereof. Olefins which are suitable for use as the second component in the deinking agents in the present invention are detergent-range olefins containing from about 8 to about 22 carbon atoms. These olefins can be alpha olefins or internal olefins and they may be linear or branched, but are preferably linear or lightly branched. Single cut olefins or mixtures of olefins may also be used. In a particularly preferred embodiment, the olefin is an alpha olefin containing from about 12 to about 18 carbon atoms.

Preferred olefins for use in the second component of the deinking agent are, for practical reasons of availability, the commercial olefin products in the $C_8$ to $C_{22}$ range. While commercial production of such olefins may be carried out by the cracking of paraffin wax, commercial production is more commonly accomplished by the oligomerization of ethylene using procedures well known in the art. The resulting oligomerization products are substantially of linear structure. Commercial olefin products manufactured by ethylene oligomerization are marketed in the United States by Chevron Corporation and Albermarle, and by Shell Chemical Company under the trademark NEODENE.. Specific procedures for preparing suitable linear olefins from ethylene are described in U.S. Pat. Nos. 3,676,523, 3,686,351, 3,737,475, 3,825,615 and 4,020,121, the teachings of which are incorporated herein by reference. While most of such olefin products are comprised largely of alpha-olefins, higher linear internal olefins are also commercially produced, for example, by the chlorination-dehydrochlorination of paraffins, by paraffin dehydrogenation, and by isomerization of alpha-olefins. Linear internal olefin products in the $C_8$ to $C_{22}$ range are marketed by Shell Chemical Company and by Liquichemica Company. These commercial products, whether predominantly internal or alpha-olefins typically contain about 70 percent by weight or more, most often about 80 percent by weight or more, linear mono-olefins in a specified carbon number range (e.g., $C_{10}$ to $C_{12}$, $C_{11}$ to $C_{15}$, $C_{12}$ to $C_{13}$, $C_{15}$ to $C_{18}$, etc.), the remainder of the product being olefin of other carbon number or carbon structure, diolefins, paraffins, aromatics, and other impurities resulting from the synthesis process. Olefins in the $C_{12}$ to $C_{18}$ range are considered most preferred for use as the olefin component in the deinking agent in the present invention.

Saturated hydrocarbons suitable for use as a second component in the deinking agent generally contain from about 8 o about 20 carbon atoms, and preferably from about 12 to about 16 carbon atoms. Examples of suitable saturated hydrocarbons include decane, dodecane, tetradecane, hexadecane, octadecane and the like, and mixtures thereof.

The third component of the deinking agent of the present invention comprises one or more detergent-range alcohols having from about 8 to about 20 carbon atoms. Suitable alcohols for use in the deinking agent of the present invention have from about 8 to about 20 carbon atoms, preferably from about 8 to about 15 carbon atoms, and more preferably from about 9 to about 11 carbon atoms. Preferably, the alcohols have a carbon structure which is linear (straight chain) or only moderately branched. Predominantly linear alcohols are preferred for reasons relating to biodegradability in process effluents rather than to deinking performance. Similarly, primary alcohols are preferred, although the invention may be suitably practiced using secondary or tertiary alcohols.

Alcohols which are suitable as a third component in the deinking agent in the instant invention include coconut fatty alcohols, stearyl fatty alcohols, tallow fatty alcohols, and the commercially available synthetic long-chain fatty alcohol blends, e.g., the $C_{12}$ to $C_{15}$ alcohol blends available as NEODOL 25 Alcohol (a registered trademark of product manufactured and sold by Shell Chemical Company), the $C_9$ to $C_{11}$ alcohol blends available as NEODOL 91 Alcohol, the $C_{14}$ to $C_{15}$ alcohol blends available as NEODOL 45 Alcohol, the $C_{12}$ to $C_{14}$ alcohol blends available as Tergitol 24L (a registered trademark of product manufactured and sold by Union Carbide Corporation), and the $C_{12}$ to $C_{13}$ alcohol blends available, for example, as NEODOL 23 Alcohol (Shell).

In the present invention, the ratio of the first component (alcohol ethoxylate) of the deinking agent to the second component (olefin) of the deinking agent to the third component of the deinking agent is typically in the range of from about 10:1:1 to about 2:1:1, and preferably in the range of from about 8:1:1 to about 7:3:3. In a particularly preferred embodiment, the ratio of the first component of the deinking agent to the second component of the deinking agent to the third component of the deinking agent will be about 7.5:1:1.5.

The invention applies the deinking agent comprising a detergent-range alcohol ethoxylate component, a component selected from the group consisting of a detergent-range olefin, a $C_8$ to $C_{20}$ saturated hydrocarbon and mixtures thereof, and a detergent-range alcohol component, to wastepaper which is necessarily in the form of a pulp, that is, to mixed office wastepaper which has first been substantially reduced to the individual fibers. Pulping is suitably conducted using any of the various conventional processes and equipment designed for this purpose. Most conveniently, the mixed office wastepaper process feedstock is treated in a device known as a "hydrapulper", which produces a slurry of the fibers in water having a pH of about 9 to about 12.

During the pulping step, the resulting fibers are contacted in an aqueous medium with the deinking agent. This contacting step may suitably be carried out in the pulping equipment, for example, by simply adding deinking agent and caustic to the aqueous slurry of the hydrapulper. This may be done either before or after addition of the mixture of xerographically printed wastepaper and ledger printed wastepaper to the hydrapulper. Alternatively, the contact may be carried out using separate processing equipment such as for example, kneaders and dispergers, which provides for agitation of the aqueous pulp slurry. For the contact step, the solids content of the pulp is present in a quantity typically between about 0.5 percent by weight and about 30.0 percent by weight, calculated as the dry weight of the mixed wastepaper feed relative to total weight of the slurry formed. In a preferred embodiment, the slurry contains between about 5 percent by weight and about 20 percent by weight paper fiber. The amount of deinking agent present in the slurry is suitably between about 0.05 percent by weight and about 2.0 percent by weight, calculated basis dry fiber weight. In a preferred embodiment, the quantity of deinking agent utilized is between about 0.1 percent by weight and about 1.0 percent by weight, with between about 0.2 percent by weight and about 0.5 percent by weight being particularly preferred.

During contact between the pulp fiber and the deinking agent, it is preferable that the aqueous contact medium be maintained at alkaline pH. A pH value greater than about 7 is preferred, a pH between about 7 and about 13 is more preferred, and a pH between about 8 and about 10 is generally most preferred. The alkalinity is generally maintained by the addition of base such as, for example, caustic or sodium silicate, to the aqueous contact medium. Typically, the amount of base added to the contact medium is in the range of from about 1 percent by weight to about 4 percent by weight calculated basis the dry weight of the pulp fiber.

In addition to water, pulp, base and deinking agent, the contact slurry may further contain other substances conventionally employed in deinking processes such as, for example, brighteners, solvents, antifoam agents, water softeners and the like. If desired, other deinking agents may be present in addition to the alcohol ethoxylate, olefin and/or saturated hydrocarbon and the detergent range alcohol deinking agent, such as, for example, alcohol propoxyethoxylates, glycols such as hexylene glycol, fatty acids, fatty acid propoxyethoxylates and the like. In particular, these additional deinking agents may be added to the pulper when the deinking agent comprising a detergent-range alcohol ethoxylate component, a detergent-range olefin and/or a saturated hydrocarbon component and a detergent-range alcohol component, is added to separate process equipment. However, the use of additional deinking agents is neither necessary nor preferred.

Processing of the pulp slurry during contact with the deinking agent is preferably carried out at elevated temperatures, particularly temperatures in the range of from about 30° C. to about 95° C. The invention has been found to be particularly effective at a temperature in the range of from about 35° C. to about 70° C., while a temperature in the range of from about 40° C. to about 60° C. is considered especially preferred.

The contact time for the mixed wastepaper pulp and the aqueous deinking medium is not critical for purposes of this invention. However, a contact time of greater than about 10 minutes is preferred from the standpoint of deinking performance. For purposes of process efficiency, it is preferred that the contact time be in the range of from about 15 minutes to about one hour, and more preferred that the contact time be in the range of from about 20 minutes to about 50 minutes.

Following the contact step between the pulp and the aqueous medium containing the deinking agent comprising a detergent-range alcohol ethoxylate component, a detergent-range olefin and/or a saturated hydrocarbon component, and a detergent-range alcohol component, the mixture is treated for separation between the pulp fibers and the ink particles which are both dispersed, or suspended, in the medium. Separation of one or the other from the medium is suitably carried out by techniques commonly applied in conventional deinking practices, including those treatments known in the art as washing and flotation. In washing, the ink particles are rinsed from the pulp by contact with a flow of water, usually a countercurrent flow relative to the pulp. Among the devices commercially used for washing and suitable for use in the practice of the present invention are the sidehill screen, the gravity decker or drum washer, the inclined screw extractor, the screw press, and the twin wire press. Centrifugal cleaners of various designs may also be used to separate the ink from the pulp. Flotation methods of ink isolation generally involve bubbling a stream of air or another gas through the pulp. The air bubbles rise to the surface and carry the ink particles with them thereby generating foam which can be separated. It will be understood that in addition to pulping, contact and ink removal steps described herein, the invention may be practiced using other process steps as are employed in wastepaper reclamation operations in general and office wastepaper in particular.

The ranges and limitations provided in the instant specification and claims are those which are believed to particularly point out and distinctly claim the present invention. It is, however, understood that other ranges and limitations which perform substantially the same function in substantially the same manner to obtain the same or substantially the same result are intended to be within the scope of the instant invention as defined by the instant specification and claims.

The invention will be described below by the following examples which are provided for purposes of illustration and are not to be construed as limiting the invention.

ILLUSTRATIVE EMBODIMENTS

EXAMPLE 1

This example illustrates the deinking of a 50:50 mixture of xerographically printed and ledger printed paper carried out using a deinking agent comprising a 7.5:1:1.5 ratio of NEODOL® 45-7 (a mixture of $C_{14}$ to $C_{15}$ predominantly linear and primary alcohols, about 52% wt. $C_{14}$ and 48% wt. $C_{15}$, containing an average of 7 oxyethylene units per molecule) to NEODENE® 14 (at least 95% $C_{14}$ and at least 94% normal alpha olefin) to NEODOL® 45 (a mixture of $C_{14}$ to $C_{15}$ predominantly linear and primary alcohols, about 52% wt. $C_{14}$ and 48% wt. $C_{15}$).

To test the performance of the invention, the following procedures were carried out for the deinking of mixed xerographically printed and laser printed wastepaper.

Sample Preparation. Mixed xerographically printed and laser printed paper was aged at least three days and then shredded by hand and mixed well. Multiple copies of the same printed page were used.

Hydrapulping and Deinking. Deionized water was heated to 40°–45° C. Sodium hydroxide pentahydrate was added to adjust the pH to about 9. To this was added 0.75 milliliters of the deinking agent (0.25% weight calculated on the weight of the pulp). A slurry of about 12% consistency was prepared by adding 150 grams of shredded xerographically printed paper and 150 grams of shredded ledger printed paper. This slurry was mixed for 30 minutes in an Adirondack, Formax 450 pulper on the high speed stir setting.

This slurry was separated into two equal portions. One portion of the slurry was made into sheets using Buchner funnel filtration. The other portion was subjected to flotation.

Flotation. Deionized water was heated to 40°–45° C. and about 2 liters placed in a Denver Flotation Machine. This unit consists of a stir motor, an impeller shaft and stirrer blade and a container for the pulp slurry. As the slurry is stirred, air is drawn down the hollow stirrer shaft and exits at the stirrer blades through small holes. The air bubbles created in the fashion rise through the pulp slurry taking ink particles with them. The froth at the top of the container is removed to separate the ink particles from the pulp slurry.

The pulp slurry was added to the container and diluted to a total volume of about 2.5 liters using additional 40°–45° C. tap water. Pulp slurry consistency was about 1.0% by weight. This mixture was stirred for 3 minutes at 1200 revolutions per minute while slurry foam was skimmed off and collected.

The slurry was decanted from the flotation cell without pulp loss.

Paper Making. Deinking process performance was measured by making paper from the deinked pulp and analyzing the paper for brightness and visible ink particles. The standard of comparison for determining the percent of visible ink particle removed was the paper sheets made immediately after pulping. The pulp was divided into four portions so that at least three, and preferably four, hand-sheets each weighing 2–4 grams could be made. Each portion of pulp was dispensed in 40°–45° C. tap water and poured into a Buchner funnel fitted with Whatman Number 40 filter paper and placed in a vacuum flask connected to a house vacuum line.

In the Buchner funnel, pulp was deposited forming a wet sheet, through which water drained rapidly. The sheet thus formed was covered with two pieces of thick dry filter paper (two above and two below) and the several layers then squeezed by rolling with a 30 lb. rolling pin. The layers were next removed from the apparatus and the prepared sheet separated from the filter papers. Finally, the prepared sheet was placed between four thick filter papers (two above and two below), pressed with a force of 50 psig, and dried between fresh thick filter papers at room temperature in the dark for about 24 hours.

The papers ("Buchner funnel pads") thus prepared were analyzed for brightness. Brightness measurements were made on the basis of percent light reflection from the sheet, using a standardized Technidyne Technibrite™ ERIC 950 meter. Eight measurements were made for each sheet, one at the center of each of four quadrants on both sides, and the eight values averaged for the sheet. Normally, the eight separate measurements varied over a range of no more than about 1%. Reported brightness readings were the average of the brightness results for at least three similarly processed sheets.

The hand sheets were inspected for visible ink particles using an image analysis method. Images of the entire sheet were directly input into an Applied Vision Systems ASA 2000 Image Analyzer. The visible ink particle count (in parts per million) was determined for particles larger in area than 0.02 square millimeters.

The results of these tests are presented in Table I.

EXAMPLE 2

The procedures of Example 1 were repeated with the exception that the deinking agent used was a 8:1:1 ratio of NEODOL® 45-7 (a mixture of $C_{14}$ to $C_{15}$ predominantly linear and primary alcohols, about 52% wt. $C_{14}$ and 48% wt. $C_{15}$ containing an average of 7 oxyethylene units per molecule) to NEODENE® 14 (at least 95% $C_{14}$ and at least 94% normal alpha olefin) to NEODOL® 45 (a mixture of $C_{14}$ to $C_{15}$ predominantly linear and primary alcohols, about 52% wt. $C_{14}$ and 48% wt. $C_{15}$).

The results are presented in Table I.

EXAMPLE 3

The procedures of Example 1 were repeated with the exception that the deinking agent used was a 7:2:1 ratio of NEODOL® 45-7 (a mixture of $C_{14}$ to $C_{15}$ predominantly linear and primary alcohols, about 52% wt. $C_{14}$ and 48% wt. $C_{15}$ containing an average of 7 oxyethylene units per molecule) to NEODENE® 14 (at least 95% $C_{14}$ and at least 94% normal alpha olefin) to NEODOL® 45 (a mixture of $C_{14}$ to $C_{15}$ predominantly linear and primary alcohols, about 52% wt. $C_{14}$ and 48% wt. $C_{15}$).

The results are presented in Table I.

EXAMPLE 4

The procedures of Example 1 were repeated with the exception that the deinking agent used was a 5.1:1.0:0.7:0.8 ratio of NEODOL® 45-7 (a mixture of $C_{14}$ to $C_{15}$ predominantly linear and primary alcohols, about 52% wt. $C_{14}$ and 48% wt. $C_{15}$ containing an average of 7 oxyethylene units per molecule) to NEODENE® 14 (at least 95% $C_{14}$ and at least 94% normal alpha olefin) to NEODOL® 45 (a mixture of $C_{14}$ to $C_{15}$ predominantly linear and primary alcohols, about 52% wt. $C_{14}$ and 48% wt. $C_{15}$) to hexylene glycol.

The results are presented in Table I.

COMPARATIVE EXAMPLE A

The procedures of Example 1 were repeated with the exception that no deinking agent was used.

The results are presented in Table I.

COMPARATIVE EXAMPLE B

The procedures of Example 1 were repeated with the exception that the deinking agent used was a 3:1 ratio of NEODOL® 45-7 (a mixture of $C_{14}$ to $C_{15}$ predominantly linear and primary alcohols, about 52% wt. $C_{14}$ and 48% wt. $C_{15}$ containing an average of 7 oxyethylene units per molecule) to NEODOL® 45 (a mixture of $C_{14}$ to $C_{15}$ predominantly linear and primary alcohols, about 52% wt. $C_{14}$ and 48% wt. $C_{15}$).

The results are presented in Table I.

COMPARATIVE EXAMPLE C

The procedures of Example 1 were repeated with the exception that the deinking agent used was a 3:1 ratio of NEODOL® 45-7 (a mixture of $C_{14}$ to $C_{15}$ predominantly linear and primary alcohols, about 52% wt. $C_{14}$ and 48% wt. $C_{15}$ containing an average of 7 oxyethylene units per molecule) to NEODENE® 14 (at least 95% $C_{14}$ and at least 94% normal alpha olefin).

The results are presented in Table I.

TABLE I

| Ex. | Deinking Surfactant | % Visible Ink Removal Flotation | Residual Ink Surface Area (ppm) Flotation | TAPPI Brightness (%) Flotation |
| --- | --- | --- | --- | --- |
| 1 | 7.5:1:1.5 NEODOL 45-7:NEODENE 14:NEODOL 45 | 3 | 98 | 48 | 76 |
| 2 | 8:1:1 NEODOL 45-7:NEODENE 14:NEODOL 45 | 3 | 94 | 81 | 77 |
| 3 | 7:2:1 NEODOL 45-7:NEODENE 14:NEODOL 45 | 3 | 96 | 61 | 77 |
| 4 | 5.1:1:0.7:0.8 NEODOL 45-7:NEODENE 14:NEODOL 45:hexylene glycol | 3 | 99 | 6 | 76 |
| Comp. Ex. A | None | | 0 | 1292 | 68 |
| Comp. Ex. B | 3:1 NEODOL 45-7:NEODOL 45 | 2 | 93 | 144 | 76 |
| Comp. Ex. C | 3:1 NEODOL 45-7:NEODENE 14 | 2 | 0 | 1862 | 70 |

DISCUSSION OF THE RESULTS

As can be seen in Table I, ternary blends of NEODOL 45-7, NEODENE 14 and NEODOL 45 provided very high visible ink particle removal after flotation in comparison to binary system 3:1 NEODOL 45-7 and NEODENE 14 (Comparative Example C). Examples 1, 2, and 3 indicate that these ternary blends are highly effective in removing visible ink particles while producing a high brightness pulp. A ternary blend with ratio 7.5:1,0:1.5, NEODOL 45-7; NEODENE 14:NEODOL 45 (Example 1) was found to be optimum for removing visible ink. Deinked pulp residual ink surface was also lower for ternary systems versus binary systems.

No deinking agent was used in Comparative Example E. Not surprisingly, residual ink surfactant was much higher and no visible ink was removed. Brightness was also significantly lower in the absence of a deinking agent.

Hexylene glycol was added to increase liquidity and stability of formula at lower temperatures and to increase ink removal efficiency. Hexylene glycol was added to a deinking agent containing the optimum ratio for surfactant system (7.5:1.0.0:1.5, NEODENE 14; NEODOL 45). In Example 4, 2.8 parts of hexylene was added to 6.8 parts of Example 1. Example 4 gave an equal visible ink removal equal to optimum system (Example 1), but showed a significant improvement in residual ink surface area.

In Comparative Example B, a binary system with 3:1 NEODOL 45-7 and NEODOL 45 was used. Brightness obtained with this system was comparable to brightness obtained with ternary systems. The visible ink removal for this system was significantly lower than the ternary systems of Example 1 and Example 3. Also, the residual ink surface area obtained with Comparative Example B was much higher than that obtained with ternary systems.

In Comparative Example C, a binary system with a 3:1 NEODOL 45-7: NEODENE 14, was used. Brightness obtained with this system was much lower than with the ternary systems in Example 1, Example 2, and Example 3. No significant ink removal was observed with this system.

The comparison of Example 1, Example 3, and Example 4 with Comparative Examples B and C indicate that all three components are necessary in the deinking agent in order for maximum removal of visible ink particles to be achieved.

WHAT IS CLAIMED IS:

1. A process for the deinking of a mixture of xerographically printed wastepaper stocks and ledger printer wastepaper stocks which comprises:

a) converting the wastepaper to a pulp, b) contacting the pulp with an aqueous medium of alkaline pH containing between about 0.05 and about 2 percent by weight, calculated on a dry weight basis of the pulp, of a deinking agent consisting essentially of a first component comprising at least one ethylene oxide adduct of a detergent-range alcohol having in the range of from about 8 to about 20 carbon atoms and an average of from about 3 to about 20 oxyethylene units per molecule of alcohol, a second component selected from the group consisting of one or more detergent-range alpha olefins having from about 8 to about 22 carbon atoms, one or more saturated hydrocarbons having from about 8 to about 20 carbon atoms, and mixtures thereof, and a third component comprising a detergent-range alcohol component having from about 8 to about 20 carbon atoms wherein said deinking agent has a ratio of first component to second component to third component in the range of from 10:1:1 to about 2:1:1, and c) treating the resulting pulp-containing medium by flotation to remove suspended ink therefrom.

2. The process of claim 1 wherein said first component is an ethylene oxide adduct of a detergent-range alcohol having from about 12 to about 18 carbon atoms and an average of from about 3 to about 13 oxyethylene units per molecule of alcohol.

3. The process of claim 1 wherein said second component is selected from the group consisting of one or more detergent-range olefins having from about 12 to about 18 carbon atoms, one or more saturated hydrocarbons having from about 12 to about 16 carbon atoms, and mixtures thereof.

4. The process of claim 1 wherein said second component is a detergent-range olefin having from about 12 to about 18 carbon atoms.

5. The process of claim 1 wherein said second component is a saturated hydrocarbon selected from the group consisting of decane, dodecane, tetradecane, hexadecane, octadecane and mixtures thereof.

6. The process of claim 1 wherein said third component is a detergent-range alcohol component having from about 8 to about 15 carbon atoms.

7. The process of claim 1 wherein said deinking agent has a ratio of first component to second component to third component in the range of from about 8:1:1 to about 7:3:3.

8. The process of claim 1 wherein the aqueous medium contains between about 0.5 percent by weight and about 30 percent by weight of pulp and step b) of the process is carried out at a temperature in the range of from about 30° C. to about 95° C.

9. The process of claim 8 wherein the aqueous medium contains between about 5 percent by weight and about 20 percent by weight of pulp and step b) of the process is carried out at a temperature in the range of from about 40° C. to about 70° C.

10. The process of claim 1 wherein the aqueous medium of alkaline pH has a pH in the range of from about 8 to about 10.

11. The process of claim 1 wherein in step b) said deinking agent is added in a quantity between about 0.1 percent by weight to about 1.0 percent by weight.

12. The process of claim 11 wherein in step b) said deinking agent is added in a quantity between about 0.2 percent by weight to about 0.5 percent by weight.

* * * * *